US008509076B2

(12) United States Patent
Reznik et al.

(10) Patent No.: US 8,509,076 B2
(45) Date of Patent: Aug. 13, 2013

(54) METHOD AND APPARATUS FOR SENDING FEEDBACK FOR A DOWNLINK SHARED SERVICE TRANSMITTED TO A PLURALITY OF WIRELESS TRANSMIT/RECEIVE UNITS

(75) Inventors: Alexander Reznik, Titusville, NJ (US); Eldad M. Zeira, Huntington, NY (US); Christopher R. Cave, Verdun (CA); Paul Mariner, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 1089 days.

(21) Appl. No.: 11/869,923

(22) Filed: Oct. 10, 2007

(65) Prior Publication Data
US 2008/0084844 A1   Apr. 10, 2008

Related U.S. Application Data

(60) Provisional application No. 60/828,881, filed on Oct. 10, 2006, provisional application No. 60/883,594, filed on Jan. 5, 2007.

(51) Int. Cl.
*H04J 1/16* (2006.01)
*H04J 3/16* (2006.01)

(52) U.S. Cl.
USPC .......................... 370/235; 370/252; 370/465

(58) Field of Classification Search
USPC .............. 370/235, 236.1, 252, 335, 329, 336, 370/337, 338, 347, 465
See application file for complete search history.

(56) References Cited

U.S. PATENT DOCUMENTS

| 2003/0005382 | A1 | 1/2003 | Chen et al. |
| 2003/0210668 | A1 | 11/2003 | Malladi et al. |
| 2004/0152458 | A1 | 8/2004 | Hottinen |
| 2006/0176966 | A1* | 8/2006 | Stewart et al. ............... 375/260 |

(Continued)

FOREIGN PATENT DOCUMENTS

| EP | 1641302 | 3/2006 |
| EP | 1718097 | 11/2006 |

(Continued)

OTHER PUBLICATIONS

Third Generation Partnership Project, "Technical Specification Group Radio Access Network; Medium Access Control (MAC) Protocol Specification (Release 6)", 3GPP TS 25.321 V6.13.0 (Jun. 2007).

(Continued)

*Primary Examiner* — Andrew Lee
(74) *Attorney, Agent, or Firm* — Volpe and Koenig, P.C.

(57) ABSTRACT

A wireless transmit/receive units (WTRUs) receives a downlink transmission from a Node-B and decodes the downlink transmission. If the decoding is not successful, the WTRU sends a pre-defined burst signifying a negative acknowledgement (NACK) to the Node-B via a contention-based shared feedback channel. The pre-defined burst may be sent only once without requiring an acknowledgement. The Node-B calibrates a downlink transmit power so that the downlink transmission is transmitted to the WTRUs with a high likelihood. The Node-B may send a downlink transmission including multiple data streams processed using different modulation and coding schemes so that a WTRU having a high signal quality decodes all data streams while a WTRU having a low signal quality decodes less than all data streams. The Node-B sends a channel quality indicator (CQI) threshold so that each WTRU determines a data stream to report feedback based on the CQI threshold and a measured CQI.

50 Claims, 3 Drawing Sheets

(56) References Cited

U.S. PATENT DOCUMENTS

| | | | |
|---|---|---|---|
| 2007/0113119 A1 | 5/2007 | Hafed et al. | |
| 2008/0084844 A1* | 4/2008 | Reznik et al. | 370/330 |
| 2008/0170541 A1* | 7/2008 | Vartiainen et al. | 370/328 |
| 2008/0261582 A1 | 10/2008 | Sarkar et al. | |
| 2009/0023467 A1* | 1/2009 | Huang et al. | 455/522 |
| 2009/0268676 A1* | 10/2009 | Wigard et al. | 370/329 |
| 2010/0014434 A1* | 1/2010 | Reznik et al. | 370/242 |
| 2010/0189025 A1* | 7/2010 | Cheng | 370/312 |
| 2010/0220693 A1* | 9/2010 | Ho | 370/336 |
| 2010/0226263 A1 | 9/2010 | Chun et al. | |
| 2010/0290407 A1* | 11/2010 | Uemura | 370/329 |
| 2010/0329182 A1* | 12/2010 | Wigard et al. | 370/328 |

FOREIGN PATENT DOCUMENTS

| | | |
|---|---|---|
| WO | 2004/042963 | 5/2004 |
| WO | 2004/057898 | 7/2004 |
| WO | 2005/018144 | 2/2005 |
| WO | 2005/022809 | 3/2005 |
| WO | 2005/034397 | 4/2005 |
| WO | 2005/079021 | 8/2005 |
| WO | 2005/101738 | 10/2005 |
| WO | 2006/034819 | 4/2006 |
| WO | 2006/083140 | 8/2006 |
| WO | 2006/088301 | 8/2006 |
| WO | 2006/105010 | 10/2006 |

OTHER PUBLICATIONS

Dawkins, "Siobhan's Problem: The Coupon Collector Revisited," The American Statistician, vol. 45, No. 1, pp. 76-82 (Feb. 1991).
Digital Video Broadcasting, "Hierarchical Modulation Explained", A Brief Introduction, DVB-T Hierarchical Modulation, (Mar. 2000).
Gesbert et al., "How Much Feedback is Multi-User Diversity Really Worth?" IEEE International Conference on Communications, vol. 1, pp. 234-238, XP010709995 (Jun. 20, 2004).
LG Electronics, "Enhancements Of CELL-FACH State", 3GPP TSG-RAN WG2 #54, R2-062440, (Tallinn, Estonia Aug. 28-Sep. 1, 2006).
LG Electronics, "MBMS On HSDPA", 3GPP TSG RAN WG2 Meeting #51, R2-060583, (Denver Feb. 13-17, 2006).
Third Generation Partnership Project, "Technical Specification Group Radio Access Network; Physical Channels and Mapping of Transport Channels Onto Physical Channels (FDD) (Release 6)", 3GPP TS 25.211 V6.7.0 (Dec. 2005).
Third Generation Partnership Project, "Technical Specification Group Radio Access Network; Physical Channels and Mapping of Transport Channels Onto Physical Channels (FDD) (Release 6)", 3GPP TS 25.211 V6.8.0 (Sep. 2007).
Third Generation Partnership Project, "Technical Specification Group Radio Access Network; Physical Channels and Mapping of Transport Channels Onto Physical Channels (FDD) (Release 7)", 3GPP TS 25.211 V7.0.0 (Mar. 2006).
Third Generation Partnership Project, "Technical Specification Group Radio Access Network; Physical Channels and Mapping of Transport Channels Onto Physical Channels (FDD) (Release 7)", 3GPP TS 25.211 V7.3.0 (Sep. 2007).
Third Generation Partnership Project, "Technical Specification Group Radio Access Network; Physical Layer Procedures (FDD) (Release 6)", 3GPP TS 25.214 V6.8.0 (Mar. 2006).
Third Generation Partnership Project, "Technical Specification Group Radio Access Network; Physical Layer Procedures (FDD) (Release 6)", 3GPP TS 25.214 V6.9.0 (Jun. 2006).
Third Generation Partnership Project, "Technical Specification Group Radio Access Network; Physical Layer Procedures (FDD) (Release 6)", 3GPP TS 25.214 V6.11.0 (Dec. 2006).
Third Generation Partnership Project, "Technical Specification Group Radio Access Network; Physical Layer Procedures (FDD) (Release 7)", 3GPP TS 25.214 V7.1.0 (Jun. 2006).
Third Generation Partnership Project, "Technical Specification Group Radio Access Network; Physical Layer Procedures (FDD) (Release 7)", 3GPP TS 25.214 V7.6.0 (Sep. 2007).
Third Generation Partnership Project, "Technical Specification Group Radio Access Network; Medium Access Control (MAC) Protocol Specification (Release 6)", 3GPP TS 25.321 V6.4.0 (Mar. 2005).
Third Generation Partnership Project, "Technical Specification Group Radio Access Network; Medium Access Control (MAC) Protocol Specification (Release 6)", 3GPP TS 25.321 V6.9.0 (Jun. 2006).
Third Generation Partnership Project, "Technical Specification Group Radio Access Network; Medium Access Control (MAC) Protocol Spefication (Release 6)", 3GPP TS 25.321 V6.13.0 (Jun. 2007).
Third Generation Partnership Project, "Technical Specification Group Radio Access Network; Medium Access Control (MAC) Protocol Specification (Release 7)", 3GPP TS 25.321 V7.1.0 (Jun. 2006).
Third Generation Partnership Project, "Technical Specification Group Radio Access Network; Medium Access Control (MAC) Protocol Specification (Release 7)", 3GPP TS 25.321 V7.5.0 (Jun. 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.2.0 (Sep. 2007).
Third Generation Partnership Project, "Technical Specification Group Radio Access Network; Evolved Universal Terrestrial Radio Access (E-UTRA); Physical layer procedures (Release 8)," 3GPP TS 36.213 V8.0.0 (Sep. 2007).
Third Generation Partnership Project, "Technical Specification Group Radio Access Network; Evolved Universal Terrestrial Radio Access (E-UTRA); Physical channels and modulation (Release 8)," 3GPP TS 36.211 V8.0.0 (Sep. 2007).
Third Generation Partnership Project, "Technical Specification Group Radio Access Network; Physical Channels and Modulation (Release x)," 3GPP TS 36.211 V0.0.0 (Sep. 2006).
TSGR2, "Enhanced CELL-FACH State In FDD", RP-060606, (Sep. 2006).
Weisstein, "Stirling Number of the Second Kind," available at http://mathworld.wolfram.com/StirlingNumberoftheSecondKind.html (last visited Dec. 20, 2012).
Wikipedia, "Coupon Collector's Problem," available at http://en.wikipedia.org/wiki/Coupon_collector%27s_problem (last visited Dec. 20, 2012).

\* cited by examiner

METHOD AND APPARATUS FOR SENDING FEEDBACK FOR A DOWNLINK SHARED SERVICE TRANSMITTED TO A PLURALITY OF WIRELESS TRANSMIT/RECEIVE UNITS

CROSS REFERENCE TO RELATED APPLICATION

This application claims the benefit of U.S. provisional application Nos. 60/828,881 filed Oct. 10, 2006 and 60/883,594 filed Jan. 5, 2007, which are incorporated by reference as if fully set forth.

FIELD OF INVENTION

The present invention is related to wireless communications.

BACKGROUND

Introduction of downlink shared services, (i.e., broadcast or multicast transmissions), over a high speed physical downlink shared channel (HS-PDSCH) has been discussed in several contexts including enhanced multimedia broadcast multicast services (MBMS) and transmissions to wireless transmit/receive units (WTRUs) in a radio resource control (RRC) CELL_FACH state. For the downlink shared services, the same data stream is intended for a plurality of WTRUs that are known or thought to be in a cell, and the network may allow the data to be viewable to other WTRUs. Guarantee of data delivery to some or most of the WTRUs is important and a mechanism to provide such a guarantee should be supported.

Using HS-PDSCH or similar channel for delivery of the downlink shared services offers several advantages. The HS-PDSCH is a shared physical channel well suited for delivery of services across a wide-range of quality of service (QoS) classes. The HS-PDSCH is also optimized for packet services as most shared services are likely to be, (e.g., a forward access channel (FACH) data and MBMS data are most likely packetized). The HS-PDSCH also supports hybrid automatic repeat request (HARQ), which, if combined with an appropriate feedback mechanism, can be used to guarantee or significantly improve packet delivery.

In order to take advantage of the HARQ mechanism of HS-PDSCH, a feedback mechanism is required which allows the WTRUs to send a positive acknowledgement (ACK) or a negative acknowledgement (NACK) feedback to a Node-B. In high speed downlink packet access (HSDPA), the ACK or NACK message is delivered to the Node-B via a dedicated uplink channel, (i.e., high speed dedicated physical control channel (HS-DPCCH)). This not only guarantees availability of channel resources to deliver the ACK or NACK message, it also allows the Node-B to identify which WTRU a particular ACK or NACK message originates from.

Additionally, performance of HSDPA is significantly enhanced through the availability of channel quality indicator (CQI) feedback from the WTRUs. Conventionally, the CQI is also sent via the HS-DPCCH and the Node-B may identify the source of the CQI.

While the approach above is practical when the HS-PDSCH is primarily used to carry dedicated data in a CELL_DCH state, it is no longer practical for delivery of shared data or dedicated data when the WTRUs are operating in a CELL_FACH state. Any other currently available mechanisms for delivery of ACK/NACK and CQI feedback are insufficient for state operation outside of CELL_DCH state, (i.e., when dedicated resources are unavailable). There may be a very large number of WTRUs listening to a particular shared service in a cell. Dedicating a resource to these WTRUs and requiring ACK/NACK feedback of every single packet from these WTRUs will have a highly detrimental impact on the uplink capacity of the communication systems. Moreover, WTRUs not registered in a cell cannot have an access to the resources.

Since a dedicated resource is not allocated in a CELL_FACH state, the only currently available alternative for delivering an ACK or NACK message and a CQI is via a random access channel (RACH). Delivering an ACK or NACK message and a CQI via a RACH would likely to have a severe impact on the uplink capacity and is not practical. If the ACK or NACK messages and a CQI are delivered from all WTRUs, given that the downlink data is shared among a large number of WTRUs, conventional RACH operation may require a large number of retransmission of almost all data. Therefore, delivering feedback via a RACH is impractical.

It would be desirable to provide a mechanism for feedback from WTRUs for a downlink shared service, while the impact on the uplink and downlink capacity is minimal.

SUMMARY

A method and apparatus for providing feedback for a downlink shared service transmitted to a plurality of WTRUs is disclosed. A WTRU receives a downlink transmission from a Node-B and decodes the downlink transmission. If the decoding is not successful, the WTRU sends a pre-defined burst signifying a NACK to the Node-B via a contention-based shared feedback channel. The pre-defined burst may be sent only once without requiring an acknowledgement from the Node-B. The Node-B calibrates a downlink transmit power on the downlink shared channel so that the downlink transmission is transmitted to the WTRUs with a high likelihood of success of being received. The Node-B increases a transmit power for the downlink transmission based on a predetermined function when the Node-B receives a NACK, and decreases the transmit power when the Node-B does not receive any NACK.

The Node-B may send a downlink transmission including at least two data streams processed using different modulation and coding schemes (MCSs) so that a WTRU having a high signal quality decodes all the data streams while a WTRU having a low signal quality decodes less than all data streams. The Node-B may also send at least one channel quality indicator (CQI) threshold so that each WTRU measures a CQI on the received downlink transmission and determines which data stream each WTRU should provide feedback based on the CQI threshold and the measured CQI.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

Figure 1:
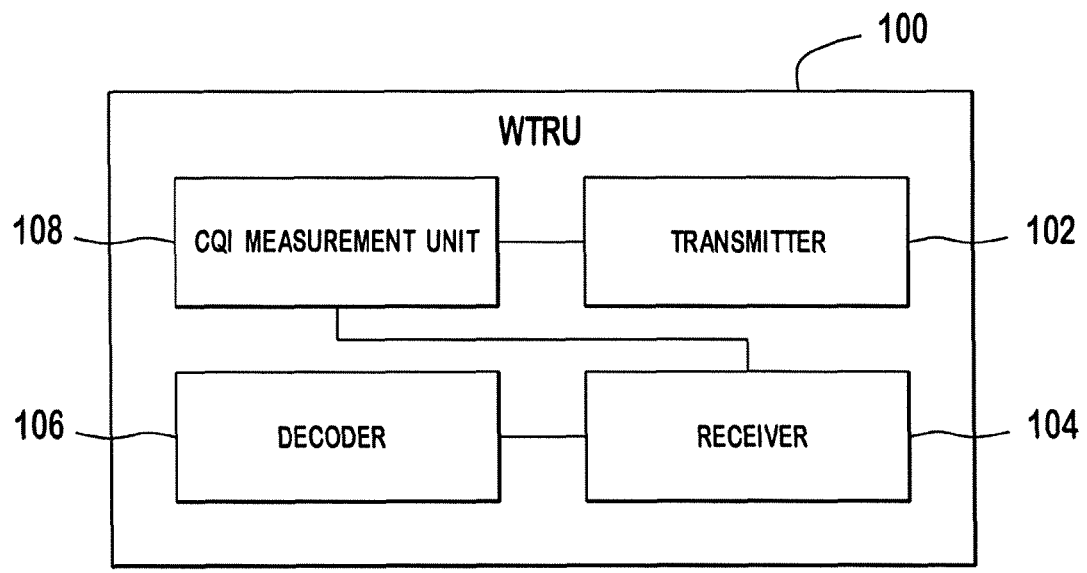
FIG. 1 is a block diagram of an example WTRU in accordance with one embodiment.

FIG. 1 is a block diagram of an example WTRU 100 in accordance with one embodiment. The WTRU 100 includes a transmitter 102, a receiver 104, a decoder 106, and a CQI measurement unit 108 (optional). The receiver 104 receives signals from a Node-B. The decoder 106 decodes the received signal from the Node-B. The decoder 106 may decode a high speed shared control channel (HS-SCCH) signal while the WTRU 100 is in a Cell_FACH state. The decoder 106 may decode a downlink transmission on a high speed physical downlink shared channel (HS-PDSCH) if the WTRU 100 successfully decodes an identity (ID) of the WTRU 100 on the signal on the HS-SCCH. The transmitter 102 sends feedback, (i.e., a CQI or an acknowledgement based on the decoding of the downlink transmission), to a Node-B via a contention-based shared feedback channel, which will be explained in detail below. The CQI measurement unit 108 outputs a CQI, which will be explained in detail below.

Figure 2:
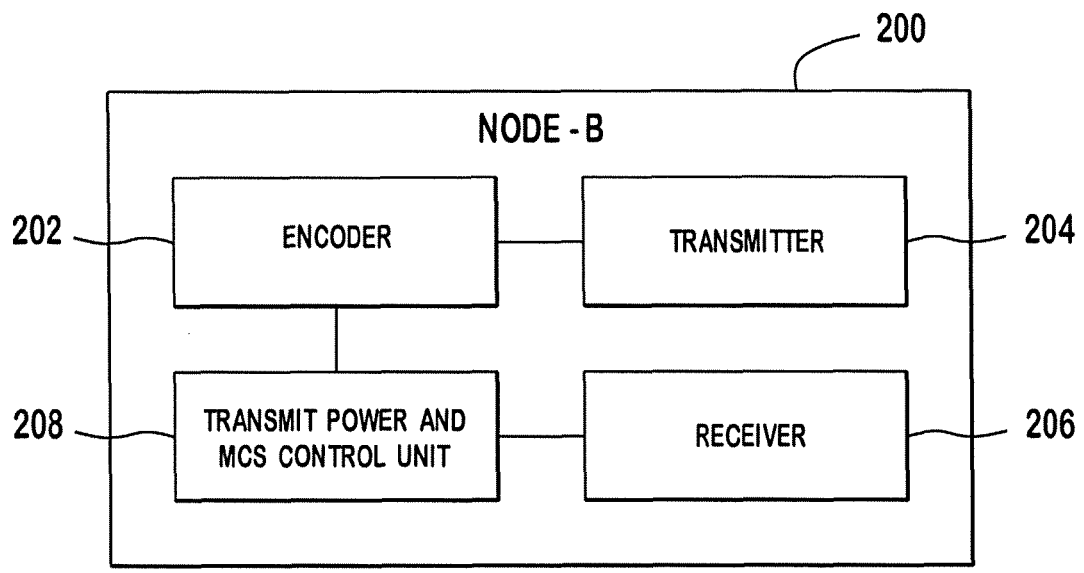
FIG. 2 is a block diagram of an example Node-B in accordance with one embodiment.

FIG. 2 is a block diagram of an example Node-B 200 in accordance with the present invention. The Node-B 200 includes an encoder 202, a transmitter 204, a receiver 206, and a transmit power and MCS control unit 208. The encoder 202 encodes data stream(s) for transmission. The transmitter 204 sends a downlink transmission including the encoded data stream(s) for a downlink shared service to a plurality of WTRUs via a downlink shared channel. The transmit power and MCS control unit 208 controls a downlink transmit power and/or an MCS on the downlink shared channel so that the downlink transmissions are transmitted to the WTRUs with a high likelihood of success of being received. The receiver 206 receives feedback from the WTRUs via a contention-based shared feedback channel.

Figure 3:
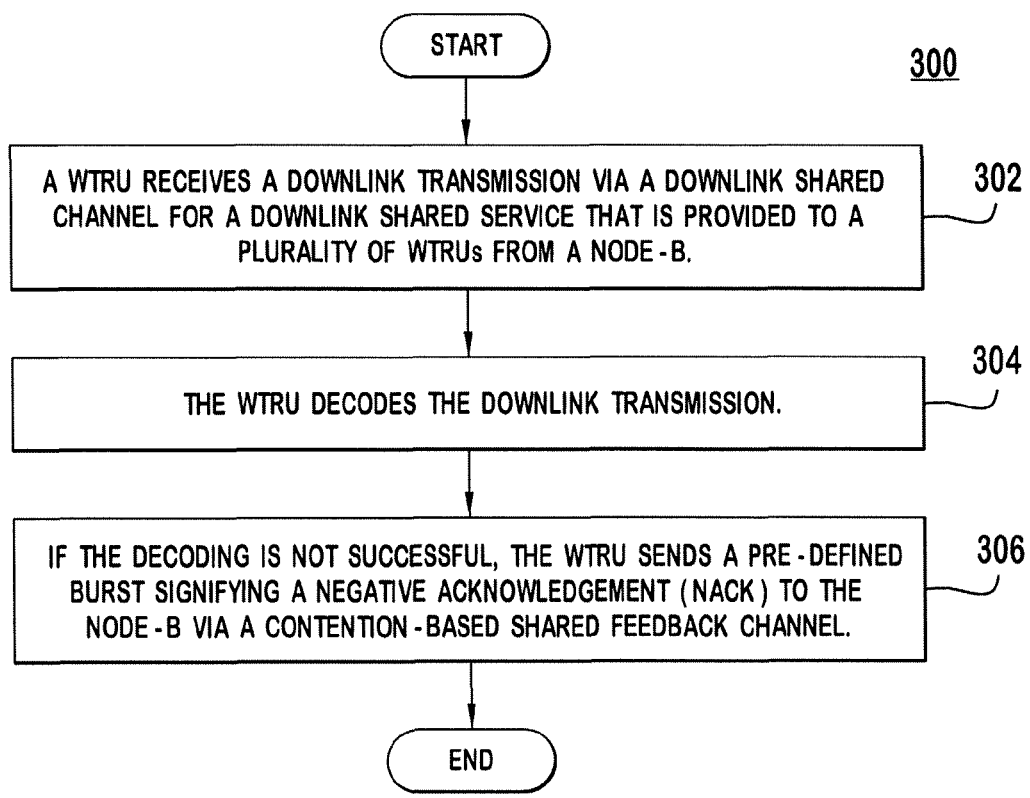
FIG. 3 is a flow diagram of a process for providing feedback for a downlink shared service via a downlink shared channel in accordance with one embodiment.

FIG. 3 is a flow diagram of a process 300 for providing feedback for a downlink shared service via a downlink shared channel in accordance with one embodiment. A WTRU 100 receives a downlink transmission via a downlink shared channel for a downlink shared service that is provided to a plurality of WTRUs from a Node-B 200 (step 302). The WTRU 100 decodes the downlink transmission (step 304). If the decoding is not successful, the WTRU 100 sends a pre-defined burst signifying a negative acknowledgement (NACK) to the Node-B 200 via a contention-based shared feedback channel (step 306). The pre-defined burst may be sent only once without requiring an acknowledgement from the Node-B 200. If the decoding is successful, the WTRU 100 does not send feedback, (i.e., an ACK is implicit).

A new uplink shared feedback channel, a physical random access feedback channel (P-RAFCH), is introduced for sending the feedback from the WTRU 100 to the Node-B 200. The P-RAFCH is a contention-based random access channel. At least one P-RAFCH may be associated with each HS-SCCH in the downlink. If several downlink shared services are supported over the HS-PDSCH(s), a set of P-RAFCHs are provided for the downlink shared services and each P-RAFCH may be dedicated to a particular downlink shared service.

The configuration of the shared feedback channel, (i.e., P-RAFCH), may be communicated via system information block (SIB) and may vary cell-by-cell. Alternatively, the shared feedback channel configuration may be signaled through dedicated RRC signaling to the WTRUs that have a connection to the radio access network (RAN), (e.g., WTRUs operating in a CELL_FACH state). The Node-B 200 broadcasts available scrambling codes and access slots for the shared feedback channel. The access slot duration may be the same as for the conventional RACH, and may be matched, (i.e., derived), to the transmission time interval (TTI) of the downlink shared services. When a WTRU 100 needs to provide feedback, the WTRU 100 randomly selects a code and an access slot associated with a particular TTI on a particular downlink shared service and sends its feedback.

In transmission of the feedback, (i.e., the pre-defined burst), no transmit power ramp-up mechanism is used, in contrast to the conventional RACH. The WTRU 100 may send each feedback only once and does not require acknowledgement of its receipt from the Node-B 200. The transmit power for the feedback may be determined based on the received power measured on a reference channel, (e.g., common pilot channel (CPICH), HS-PDSCH, etc.), and a network-supplied offset. The offset value may be included in an SIB. Alternatively, the network may instruct the WTRU 100 to use an absolute power, and provides a rule when the WTRU 100 is allowed to provide feedback. For example, the WTRU 100 may be permitted to send feedback only if the received reference channel power is above a pre-defined value.

If the WTRU 100 has selected a Node-B out of several synchronized Node-Bs which transmit the same downlink transmission, the WTRU 100 transmits a NACK only to that selected Node-B. If the WTRU 100 performs soft combining of signals from a plurality of Node-Bs in an active set, the WTRU 100 sends a NACK to the strongest Node-B in the active set.

The WTRU 100 may send a NACK each time the WTRU 100 fails to decode the downlink transmission. Alternatively, the WTRU 100 may send a NACK after two or more successive downlink transmissions have failed. For example, the WTRU 100 may send a NACK only if m out of n successive transmissions have failed. The numbers m and n may be determined by the network. For the purpose of counting m out of n, original transmissions, re-transmissions, both, or relative combination of both may be counted. The ability to actually send the NACK may depend on some random number with probability set by the network. The network may indicate desired transmission of the NACK on a cell different from the one where the downlink shared service, (e.g., MBMS), is received. The cell is indicated by the network.

In one embodiment, the feedback may be anonymous. If the feedback goes through, the Node-B 200 knows that some WTRU in the cell was not able to decode the downlink transmission in a particular TTI. Alternatively, the WTRU ID may be signaled. In accordance with one embodiment, the downlink shared service may be mapped to a WTRU-specific signature code that will be transmitted as the payload of the P-RAFCH. In accordance with another embodiment, a WTRU connection ID may be signaled along with the feedback. In accordance with yet another embodiment, the access opportunities to the contention-based shared feedback channel may be mapped to the downlink shared service so that the WTRU ID may be verified based on the predefined mapping. The mapping may be transmitted by the network.

The Node-B 200 calibrates the transmit power and/or adjusts an MCS of the downlink shared channel carrying the shared downlink service so that it covers the desired coverage area, (i.e., cell or a sector of a cell), with a high likelihood. With the transmit power and/or MCS adjustment, the probability that a WTRU 100 will not receive the downlink data in a TTI can be set to a desired operating point, preferably near zero. Since a WTRU 100 sending a NACK is almost certainly at the edge of the cell or sector, the downlink power computation should be done under this assumption. Since the Node-B 200 knows the cell or sector size, the Node-B 200 may configure the downlink transmit power and/or MCS so that it does not significantly interfere with other signals. Consequently, only very few WTRUs may need to send a NACK for any single TTI. With this the approach, where feedback power is fixed, a rule may be set to prohibit WTRUs from sending feedback.

Since a WTRU 100 sending a NACK is almost certainly at the edge of the cell or sector, the uplink transmit power on the shared feedback channel, (e.g., P-RAFCH), may be determined under this assumption. Since the Node-B 200 knows the cell or sector size, the Node-B 200 configures the uplink transmit power such that it does not significantly interfere with other signals at the Node-B 200.

Under the above assumption, (very few NACKs expected per TTI), the Node-B 200 may allocate enough shared feedback channel resources so that the probability of collision for a NACK is kept low and the Node-B 200 is able to receive a large number of NACKs without severely impacting the uplink capacity.

If the Node-B 200 receives at least one NACK, the Node-B 200 schedules a retransmission for which the NACK is received. In this way, the HS-PDSCH operates as it conventionally does under normal HSDPA operation. Packet delivery is guaranteed to the same extent as it is guaranteed under the current HARQ, (i.e., subject to a maximum limit on retransmissions and errors in the feedback of NACKs).

The Node-B may maintain a threshold value and retransmit the downlink transmission only if the number of NACKs from the WTRUs exceeds the threshold value. While data delivery is not guaranteed, it is guaranteed that no more than a few WTRUs are unhappy. This limits the impact on the downlink shared service throughput of a small number of WTRUs. Alternatively, the Node-B 200 may ignore the NACKs. The Node-B 200 may allocate no resources to the shared feedback channel to obtain the same result.

The Node-B 200 may pool the NACKs, (i.e., keep track of data that needs retransmission), and retransmit multiple downlink transmissions at a later time as a single packet. In this case, a sequence number and buffering may need to be extended.

The Node-B 200 may implement the following downlink power control mechanism for the HS-PDSCH. Let $P_n$ be the HS-PDSCH power reference, (i.e., power per bit), for TTI n. If a NACK is received, the Node-B 200 may set the transmit power reference for TTI (n+1) as follows:

$$P_{n+1} = P_n + f(\text{num.of } NACKs)\Delta_{NACK}; \text{ or} \qquad \text{Equation (1)}$$

$$P_{n+1} = P_{MAX}. \qquad \text{Equation (2)}$$

If the Node-B 200 receives no NACKs, the Node-B 200 may set the transmit power reference for TTI (n+1) as follows:

$$P_{n+1} = P_n - \Delta_{ACK}. \qquad \text{Equation (3)}$$

Figure 4:
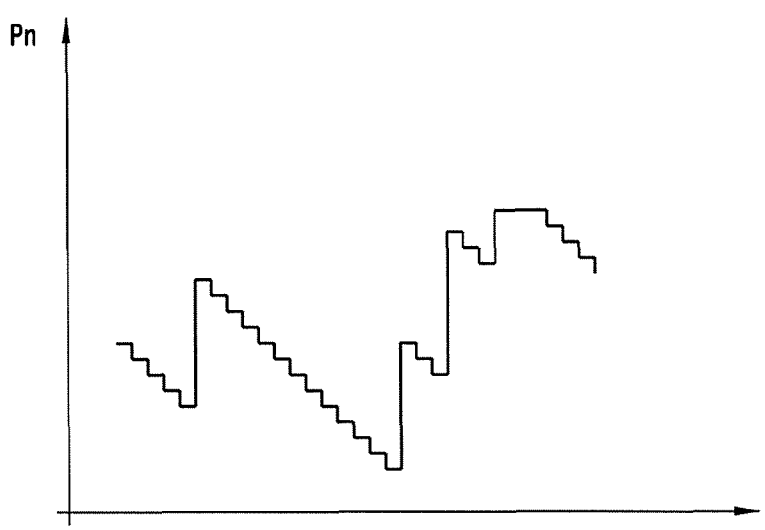
FIG. 4 shows one possible power variation scheme of an HS-PDSCH.

Here, $\Delta_{ACK}, \Delta_{NACK} > 0$, f( ) is a positive non-decreasing (but may be constant) function of its argument. If the Node-B 200 does not receive any NACKs, the Node-B 200 may bring the transmit power reference down by a pre-defined decrement. As soon as a NACK is received, the transmit power reference may be increased by a pre-defined increment. The pre-defined increment and decrement may or may not be the same. The increase may depend on the number of NACKs received (but maybe constant). The increase increment f(num.of NACKs) $\Delta_{NACK}$ is preferably much larger than the decrease decrement $\Delta_{ACK}$. FIG. 4 shows one possible power variation scheme of an HS-PDSCH.

The actual transmit power in TTI n depends on $P_n$ and the data format selected for the data, as it does conventionally. Additionally, a maximum and a minimum power may be set to limit the actual transmit power.

In addition to, or as an alternative to, the transmit power control, the Node-B 200 may adjust an MCS of the downlink shared service in a similar fashion. When no NACK is received, the Node-B 200 may increase the MCS order, and when at least one NACK is received, the Node-B 200 may lower the MCS order.

For both power control and MCS control, the Node-B 200 may consider the resources allocated to other services in determining the range of possible transmit power and MCS. For instance, if the load created by other services is low, the Node-B 200 may increase its transmission power and/or reduce the MCS utilized for the downlink shared services, which allows more WTRUs to decode the service.

When the Node-B 200 needs to know how many WTRUs are listening to the downlink shared service, the Node-B 200 may temporarily, (e.g., one (1) TTI), request all WTRUs to send NACKs. For this, the Node-B 200 may send a special burst or a data sequence with intentionally erroneous CRC check. This will force all WTRUs to respond with a NACK. The Node-B 200 counts the number of received NACKs, making allowances for losses due to fading and collisions. Not only does this provide a count that should be approximately correct, but if the NACK power is "absolute", (as opposed to relative to a received power), a distribution of uplink channel qualities is also obtained.

Figure 5:
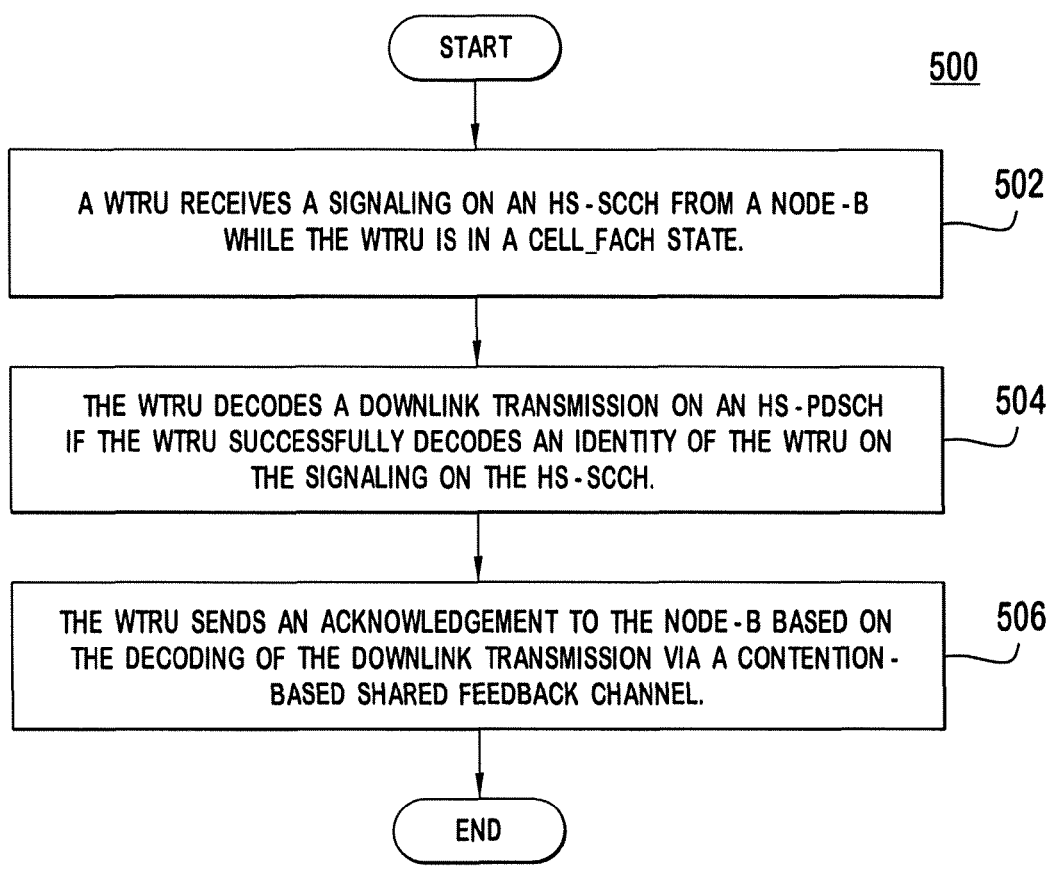
FIG. 5 is a flow diagram of a process for providing feedback for a downlink shared service transmitted to a plurality of WTRUs via HSDPA in accordance with another embodiment.

FIG. 5 is a flow diagram of a process 500 for providing feedback for downlink shared services to WTRUs via HSDPA in accordance with another embodiment. A WTRU 100 receives a signaling on an HS-SCCH from a Node-B 200 while the WTRU is in a Cell_FACH state (step 502). The WTRU 100 decodes a downlink transmission on an HS-PDSCH if the WTRU 100 successfully decodes an identity of the WTRU 100 on the signaling on the HS-SCCH (step 504). The WTRU 100 sends an acknowledgement to the Node-B 200 based on the decoding of the downlink transmission via a contention-based shared feedback channel (step 506). The transmission on the shared feedback channel and the signaling on the HS-SCCH have a fixed timing relationship.

One shared feedback channel comprises one scrambling code and one channelization code in the uplink. At least one shared feedback channel is associated with each HS-SCCH in the downlink. The shared feedback channel is shared amongst all WTRUs in a CELL_FACH that are requested to monitor the associated HS-SCCH.

Transmission over the shared feedback channel by different WTRUs is time multiplexed, and follows a timing restriction with respect to the signaling over the HS-SCCH. More specifically, a WTRU 100 transmits an ACK or NACK message over the associated shared feedback channel at a fixed time interval after having successfully decoded its WTRU ID, (i.e., high speed radio network temporary identity (H-RNTI)) over the HS-SCCH. The duration of the time interval should be set such that it is long enough for the WTRU 100 to receive and decode the data on the HS-PDSCH and evaluate whether there was an error, (i.e., cyclic redundancy check (CRC) verification), yet short enough to allow the Node-B 200 to quickly retransmit an erroneous transport block as part of the HARQ processing. The transmission over the shared feedback channel must last at most one (1) TTI length to avoid collisions between WTRUs transmitting feedback. Moreover, an adequate guard period should be defined to avoid WTRUs with different timing offsets, (e.g., near-far problem), from colliding when transmitting over the shared feedback channel.

The information and parameters related to the shared feedback channel may be signaled to the WTRU 100 at the same time as HS-SCCH-related information is signaled, either through an SIB over the broadcast control channel (BCCH)/broadcast channel (BCH) or through dedicated RRC signaling, (e.g., new information element (IE) in the RRC CONNECTION SETUP message).

The transmission power at which a WTRU 100 sends the feedback may be set based on the received power measured on a reference channel, (e.g., CPICH, HS-PDSCH, etc.), and a network-supplied offset value. The offset value may be part of the SIB. Alternatively, the network may instruct the WTRU 100 to use an absolute power, but provides a rule when the WTRU 100 is allowed to provide feedback. For example, the WTRU 100 may be allowed to send the feedback if the received reference channel power is below a pre-defined value. Alternatively, the conventional HS-SCCH may be modified to include power control information related to the transmission of feedback over the shared feedback channel. Power offset or relative power command, (e.g., increase or decrease), bits may be introduced in the HS-SCCH to adjust the transmission power of the WTRU over the shared feedback channel. Optionally, the WTRU 100 may include channel quality information in the feedback.

A scheme for sending a CQI via the P-RAFCH is disclosed hereinafter. A CQI is also transmitted via the P-RAFCH. While the CQI feedback may be either scheduled or triggered, the Node-B must be able to differentiate between NACK only feedback, CQI only feedback, and CQI feedback which is triggered by a NACK, (i.e., NACK+CQI). The P-RAFCH burst includes a data type indicator for indicating NACK only, CQI only or NACK+CQI, a data field for carrying CQI bits if needed, and a reference field for carrying a modulation phase and power reference, if needed.

These fields may be mapped into the burst by time division multiplexing (TDM), (i.e., each data is transmitted in its own time segment). Alternatively, the fields may be mapped into the burst by code division multiplexing (CDM), (e.g., a signature based structure as in the PRACH preamble). Alternatively, the fields may be mapped into the burst by frequency division multiplexing (FDM). FDM is particularly appropriate for systems, such as long term evolution (LTE), where a number of sub-carriers may be utilized. The basic physical channel resources for carrying these fields may be, but not necessarily, orthogonal at least at the WTRU.

The data field, if present, may use any multi-dimensional modulation schemes with each physical channel resource (time slot, signature, carrier, etc.) providing a dimension in the modulation vector space. Some examples of possible modulation schemes are as follows:

(1) Multi-dimensional m-phase shift keying (PSK) (including binary phase shift keying (BPSK) (m=2), quadrature phase shift keying (QPSK) (m=4)), m is an integer power of 2. The number of physical channel resources required is $M/\log_2 m$, and additional phase and power reference is required.

(2) Multi-dimensional m-quadrature amplitude modulation (QAM) (including BPSK (m=2) and QPSK (m=4)), m is an integer power of 2. The number of physical channel resources required is $M/\log_2 m$, and additional phase and power reference is required.

(3) m-ary orthogonal modulation. The number of physical channel resources required is M (i.e., m=M), and additional phase and power reference is not needed.

(4) m-ary bi-orthogonal modulation. The number of physical channel resources required is M/2 (i.e., m=M/2), and additional phase and power reference is required.

(5) Multi-dimensional on-off keying, (i.e., M/2 carriers are either with or without power). The number of physical channel resources required is M/2, (i.e., m=M/2), and additional phase and power reference is not required.

The modulation scheme to be used should be signaled to the WTRU. Certain modulation schemes may require the use of a phase and power reference, while others do not. The reference, if required, may be sent together with the data type indicator. The data type indicator and the reference field may be sent on separate physical resources. Alternatively, only the data type indicator is sent and the reference field is derived from it using decisions feedback, (i.e., the data type indicator is assumed to be demodulated correctly, which permits its re-use as a reference signal).

Additionally, in order to avoid the explicit transmission of the data type indicator, a CQI may always be triggered by the need to transmit a NACK, (i.e., a NACK and a CQI are always sent together). Alternatively, if a NACK is sent and a CQI does not need to be sent, the data field corresponding to the highest CQI value may be used. These types of transmissions are referred to as an implicit data type format. The use of this format should be signaled to the WTRU.

The Node-B detects the presence of power over the complete burst. If power is detected in a burst space, and a data type indicator is used, the Node-B reads the data type indicator. If a CQI is present, the CQI is demodulated according to the modulation scheme used. If the implicit data type format is used, the presence of power indicates a NACK and a CQI transmission.

Because of the multicast nature of the transmissions and the need to serve most or all WTRUs, the Node-B may collect CQIs over some time period. The Node-B selects the minimum CQI over this time period and schedules data rates according to the minimum CQI. In this manner all WTRUs may be highly likely to be served.

This scheme does, however, have a disadvantage that a WTRU with a bad channel condition may significantly reduce the throughput of the whole system. The Node-B has no way to identify that such a WTRU exists in a direct way because all feedback from the WTRUs is anonymous. In order to solve this problem, the Node-B may collect statistics about CQI transmissions and may ignore any CQIs that are statistically very far from the majority. The Node-B may then select a minimum CQI from the remaining CQIs and uses that as a baseline.

Alternatively, the Node-B may select a certain small subset, (e.g., lower 20% or lower 10%), of CQIs after the removal of outliers. The Node-B may then use an average of these, (e.g. the actual average, a median, etc.). Because of the multicast nature, the highest CQIs are unlikely to have any impact on the system operation. Thus, the WTRU may not send the highest possible CQI value.

Another embodiment of layer 2/3 (L2/3) based operation is disclosed hereinafter. A WTRU 100 listens to network signaling which tells the WTRU 100 when, how often, and to whom to report feedback to the downlink shared service. The WTRU 100 decodes signals on an allocated TTI for a shared downlink service. The WTRU 100 then collects statistics of decoding success or failure rate and compares to the decoding statistics to a pre-defined threshold that is provided by the network. The WTRU 100 sends feedback if the decoding statistics is worse than the pre-defined threshold.

If the WTRU 100 has selected a Node-B out of several synchronized Node-Bs which transmit the same data, the WTRU 100 transmits the feedback to that selected Node-B only. If the WTRU 100 performs soft combining of signals from a plurality of Node-Bs in an active set, the WTRU 100 sends the feedback to the strongest Node-B in the active set.

The network may indicate desired transmission of the NACK on a cell different from the one where the downlink shared service, (e.g., MBMS), is received. The cell is indicated by the network.

The downlink shared service may be mapped to a code that will be transmitted with the NACK. Alternatively WTRU connection ID may be signaled. Alternatively, if using a PRACH for the feedback, the physical channel access opportunities may be mapped to the downlink shared service. The mapping may be indicated by the network. If needed, CQI information may be transmitted together with the NACK or in its place. Since the signaling is at L2/3, a larger number of bits are supported in a straightforward fashion.

Some downlink shared services, (e.g., video), may use a layered QoS mechanism where certain users get higher throughput and quality than others. In a wireless system, an important factor that determines the QoS of a user is the throughput achievable given the location of the user in the system. The maximum throughput achievable at cell edge is typically less than the one achievable around the cell center. The layered QoS may be supported without feedback from dedicated physical channels.

One conventional layered QoS mechanism, (e.g., digital video broadcasting (DVB)), is based on hierarchical modulation. In hierarchical modulation, multiple data streams, (typically a high-priority and a low-priority), are modulated into a single signal that is received by all users. Users with good signal quality may decode both data streams while users with low signal quality may decode only the high-priority stream. For instance, the streams may be encoded as a 16 quadrature amplitude modulation (16QAM) signal. The quadrant where the signal is located represents two high priority bits whereas the position of the signal within the quadrant represents two low priority bits. Users with good signal quality are able to decode the signal as 16QAM while users with low signal quality can only decode the signal as quadrature phase shift keying (QPSK) and extract only the high priority bits.

In accordance with the present teachings, some new signaling is provided. From the network point of view, it would be unsatisfactory that all WTRUs report their ACK or NACK feedback based on decoding of the high priority stream only because it would lack information about the performance of favorably located WTRUs. On the other hand, having all WTRUs providing feedback based on decoding of all streams is also unsatisfactory because non-favorably located WTRUs would overload the P-RAFCH with NACK.

The network sets at least one CQI threshold to determine on which stream each WTRU should provide feedback. The CQI threshold(s) is signaled from the network, (e.g., on the BCCH, dedicated control channel (DCCH), or MBMS control channel (MCCH) for broadcast, multicast, or unicast).

A WTRU 100 measures its own CQI (or average CQI). The WTRU 100 compares the measured CQI to the CQI threshold(s) and determines the smallest CQI threshold higher than the measured CQI. This CQI threshold corresponds to a certain subset of stream(s) that the WTRU 100 needs to report feedback. The WTRU 100 reports ACK or NACK feedback on the decoding of the subset of stream(s) determined based on the CQI comparison. It is possible to further restrict the subset of streams to report feedback based on WTRU subscription to the high quality service.

A particular CQI threshold may be set below which the WTRU 100 is not allowed to provide feedback. For example, in the case that there are only two streams, (high priority stream and low priority stream), and two CQI thresholds, (high CQI threshold and low CQI threshold), are set, if the measured CQI is above the high CQI threshold, the WTRU 100 may report feedback on both high priority and low priority streams. If the measured CQI is below the high CQI threshold but above the low CQI threshold, the WTRU 100 may report feedback on the high priority stream only. If the measured CQI is below the low CQI threshold, the WTRU 100 may not provide feedback at all.

The Node-B 200 may change the CQI threshold(s) from time to time based on load conditions. For instance, in case the load of the Node-B 200 due to other services is low, the Node-B 200 may allocate more resources to the downlink shared services and employ less aggressive MCS to encode the streams, which allows more WTRUs to enjoy high QoS. In case of high contention between the downlink shared services and other services, the Node-B 200 may use more aggressive MCS to transmit the streams thereby reducing the amount of resources for the downlink shared services.

Alternatively, the multiple streams may be transmitted separately in different time or using different codes. For instance, a high priority stream may be transmitted with a less aggressive MCS while a low priority stream may be transmitted with a more aggressive MCS. This allows more flexibility in the selection of the MCS and CQI thresholds for decoding the streams. The disadvantage is that it is less efficient since the streams are not combined in the same signal.

Although the features and elements are described in the preferred embodiments in particular combinations, each feature or element can be used alone without the other features and elements of the preferred embodiments or in various combinations with or without other features and elements. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for sending feedback for a downlink shared service transmitted to a plurality of wireless transmit/receive units (WTRUs), the method comprising:
   a WTRU receiving a downlink transmission for a downlink shared service from a Node-B via a downlink shared channel;
   the WTRU decoding the downlink transmission;
   the WTRU randomly selecting a code and an access slot allocated for a contention-based physical layer shared feedback channel; and
   the WTRU sending a pre-defined physical layer burst indicating a negative acknowledgement (NACK) to the Node-B via the contention-based physical layer shared feedback channel on a condition that the downlink transmission is not successfully decoded.

2. The method of claim 1 wherein the pre-defined physical layer burst is sent once without requiring an acknowledgement from the Node-B.

3. The method of claim 1 wherein a transmit power for the pre-defined physical layer burst is determined based on a received power of a reference channel from the Node-B.

4. A method for supporting transmission of feedback for a downlink shared service transmitted to a plurality of wireless transmit/receive units (WTRUs) via a downlink shared channel, the method comprising:
   a Node-B sending a downlink transmission to a plurality of WTRUs via a downlink shared channel, the Node-B calibrating a downlink transmit power on the downlink shared channel; and
   the Node-B receiving a pre-defined physical layer burst as feedback for the downlink transmission from the WTRUs via a contention-based physical layer shared feedback channel, the feedback indicating a negative acknowledgement (NACK).

5. The method of claim 4 wherein the pre-defined physical layer burst is sent once without requiring an acknowledgement from the Node-B.

6. The method of claim 4 wherein the Node-B increases a transmit power for the downlink transmission based on a predetermined function when the Node-B receives a negative acknowledgement (NACK), and decreases the transmit power when the Node-B does not receive any NACK.

7. The method of claim 4 wherein the transmit power is decreased based on the number of NACKs.

8. The method of claim 4 wherein the Node-B adjusts a modulation and coding scheme (MCS) based on the feedback from WTRUs.

9. The method of claim 4 further comprising:
   the Node-B transmitting a downlink transmission including an error to the WTRUs; and
   the Node-B counting the number of WTRUs based on feedback sent in response to the downlink transmission including the error.

10. The method of claim 4 wherein the Node-B retransmits the downlink transmission on a condition that the number of negative acknowledgements (NACKs) from the WTRUs exceeds a predetermined threshold.

11. The method of claim 4 wherein the Node-B collects channel quality indicators (CQIs) from the WTRUs over some time period, selects a minimum CQI over this time period, and schedules a data rate according to the minimum CQI.

12. The method of claim 11 wherein the Node-B ignores a statistically exceptionally low CQI when selecting the minimum CQI.

13. The method of claim 4 wherein the Node-B collects CQIs from the WTRUs over some time period, selects a subset of CQIs, computes an average of CQIs in the subset, and schedules a data rate based on the average.

14. A method for supporting transmission of feedback for a downlink shared service transmitted to a plurality of wireless transmit/receive units (WTRUs) via a downlink shared channel, the method comprising:
   a Node-B sending a downlink transmission for a downlink shared service to a plurality of WTRUs via a downlink shared channel, the downlink transmission including at least two data streams, each data stream being processed using a different modulation and coding scheme (MCS) so that a WTRU having a high signal quality decodes all the data streams while a WTRU having a low signal quality decodes less than all data streams; and
   the Node-B sending at least one channel quality indicator (CQI) threshold to the WTRUs as a reference to determine which data stream the WTRUs should provide feedback.

15. A method for sending feedback for a downlink shared service transmitted to a plurality of wireless transmit/receive units (WTRUs) via a downlink shared channel, the method comprising:
   a WTRU receiving a downlink transmission for a downlink shared service from a Node-B via a downlink shared channel, the downlink transmission including at least two data streams, each data stream being processed using a different modulation and coding scheme (MCS) so that a WTRU having a high signal quality is able to decode all the data streams while a WTRU having a low signal quality is able to decode less than all data streams;
   the WTRU receiving channel quality indicator (CQI) thresholds from the Node-B;
   the WTRU measuring a CQI on the received downlink transmission;
   the WTRU determining which data stream the WTRU should provide feedback to the Node-B by comparing the measured CQI with the CQI thresholds; and
   the WTRU sending feedback for the determined data stream to the Node-B.

16. A wireless transmit/receive unit (WTRU) for providing feedback for a downlink shared service transmitted via a downlink shared channel, the WTRU comprising:
   a receiver for receiving a downlink transmission for a downlink shared service from a Node-B via a downlink shared channel;
   a decoder for decoding the downlink transmission; and
   a transmitter for randomly selecting a code and an access slot and sending a pre-defined physical layer burst indicating a negative acknowledgement (NACK) to the Node-B via a contention-based physical layer shared feedback channel on a condition that the downlink transmission is not successfully decoded.

17. The WTRU of claim 16 wherein the transmitter sends the pre-defined physical layer burst once without requiring an acknowledgement from the Node-B.

18. The WTRU of claim 16 wherein a transmit power for the pre-defined physical layer burst is determined based on a received power of a reference channel from the Node-B.

19. The WTRU of claim 16 wherein the pre-defined physical layer burst is sent at an absolute transmit power instructed by the Node-B on a condition that a received power on a reference channel from the Node-B is below a pre-defined value.

20. The WTRU of claim 16 wherein if a particular Node-B has been selected among a plurality of Node-Bs sending the same downlink transmission, the transmitter sends the pre-defined physical layer burst to the selected Node-B.

21. The WTRU of claim 16 wherein the decoder soft combines the downlink transmission received from a plurality of Node-Bs in an active set, and the transmitter transmits the pre-defined physical layer burst to a Node-B having a strongest signal among the Node-Bs in the active set.

22. The WTRU of claim 16 wherein the transmitter sends the pre-defined physical layer burst on a condition that a predetermined number of successive transmissions have failed.

23. A Node-B for supporting transmission of feedback for a downlink shared service transmitted to a plurality of wireless transmit/receive units (WTRUs) via a downlink shared channel, the Node-B comprising:
   a transmitter for sending a downlink transmission for a downlink shared service to a plurality of WTRUs via a downlink shared channel;
   a transmit power and modulation and coding scheme (MCS) control unit for controlling at least one of a downlink transmit power and an MCS on the downlink shared channel; and
   a receiver for receiving a pre-defined physical layer burst as feedback from the WTRUs via a contention-based physical layer shared feedback channel, the feedback indicating of a negative acknowledgement (NACK).

24. The Node-B of claim 23 wherein the pre-defined physical layer burst is sent once without requiring an acknowledgement from the Node-B.

25. The Node-B of claim 23 wherein the transmitter increases a transmit power for the downlink transmission based on a predetermined function when a negative acknowledgement (NACK) is received, and decreases the transmit power when no NACK is received.

26. The Node-B of claim 25 wherein the transmit power is decreased based on the number of NACKs.

27. The Node-B of claim 23 wherein the transmitter adjusts a modulation and coding scheme (MCS) based on the feedback from the WTRUs.

28. The Node-B of claim 23 wherein the transmitter is configured to transmit a downlink transmission including an error and the receiver is configured to count the number of WTRUs based on feedback sent in response to the downlink transmission including the error.

29. The Node-B of claim 23 wherein the transmitter is configured to retransmit the downlink transmission on a condition that the number of negative acknowledgements (NACKs) from the WTRUs exceeds a predetermined threshold.

30. A wireless transmit/receive unit (WTRU) for transmitting feedback for a downlink shared service transmitted to a plurality of WTRUs via a downlink shared channel, the WTRU comprising:
   a receiver for receiving a downlink transmission for a downlink shared service and channel quality indicator (CQI) thresholds from the Node-B, the downlink transmission including at least two data streams, each data stream being processed using a different modulation and coding scheme (MCS);
   a decoder for decoding the downlink transmission, a WTRU having a high signal quality being able to decode all the data streams while a WTRU having a low signal quality being able to decode less than all data streams;
   a CQI measurement unit for generating a CQI on the received downlink transmission; and
   a transmitter for determining which data stream the WTRU should provide feedback to the Node-B by comparing the measured CQI with the CQI thresholds and sending feedback for the determined data stream to the Node-B.

31. A long term evolution (LTE) wireless transmit/receive unit (WTRU) comprising:
   circuitry configured to transmit a physical uplink channel; wherein the physical uplink channel is used to send feedback information during transmission time intervals (TTIs) that the WTRU is not allocated resources for transmitting dedicated data to a wireless network; wherein the circuitry is further configured to transmit acknowledgement feedback information on a first frequency resource associated with the physical uplink channel and to transmit channel quality indicator (CQI) feedback on a second frequency resource associated with the physical uplink channel; wherein the first and second frequency resources are different.

32. The LTE WTRU of claim 31 wherein the first frequency resource and the second frequency resource are different subcarriers.

33. The LTE WTRU of claim 31 wherein the acknowledgement feedback information is a NACK.

34. The LTE WTRU of claim 31 wherein the circuitry is further configured to transmit feedback information on the physical uplink channel using on-off keying.

35. The LTE WTRU of claim 31 wherein the circuitry is further configured to utilize a threshold to determine a number of streams to report channel quality indicator information.

36. The LTE WTRU of claim 31 wherein the circuitry is further configured to receive power commands on a downlink control channel and to set a transmission power level for the physical uplink channel in response to the received power commands.

37. The LTE WTRU of claim 31 wherein the circuitry is further configured to not utilize a power ramp-up mechanism to transmit using the physical uplink channel.

38. The LTE WTRU of claim 37 wherein the circuitry is further configured to receive in a system information block (SIB) an offset value from the wireless network and transmit using the physical uplink channel at a transmission power level based on the offset value.

39. The LTE WTRU of claim 31 wherein the circuitry is further configured to not receive an acknowledgement in response to feedback information transmitted using the physical uplink channel.

40. A method comprising:
   transmitting by a long term evolution (LTE) wireless transmit/receive unit (WTRU) feedback information on a physical uplink channel, wherein the physical uplink channel is used to send feedback information during transmission time intervals (TTIs) that the WTRU is not allocated resources for transmitting dedicated data to a wireless network; wherein acknowledgement feedback information is transmitted on a first frequency resource associated with the physical uplink channel and channel quality indicator feedback is transmitted on a second frequency resource associated with the physical uplink channel; wherein the first and second frequency resources are different.

41. The method of claim 40 wherein the first frequency resource and the second frequency resource are different subcarriers.

42. The method of claim 40 wherein the acknowledgement feedback information is a NACK.

43. The method of claim 40 wherein transmitting feedback information on the physical uplink channel uses at least on-off keying.

44. The method of claim 40 further comprising determining a number of streams to report channel quality indicator information using a threshold.

45. The method of claim 40 further comprising receiving by the WTRU power commands on a downlink control channel and setting by the WTRU a transmission power level for the physical uplink channel in response to the received power commands.

46. The method of claim 40 wherein the WTRU does not utilize a power ramp-up mechanism to transmit using the physical uplink channel.

47. The method of claim 46 further comprising receiving by the WTRU an offset value from the wireless network and transmitting by the WTRU using the physical uplink channel at a transmission power level based on the offset value.

48. The method of claim 40 wherein the WTRU does not receive an acknowledgement in response to the feedback information transmitted using the physical uplink channel.

49. A long term evolution (LTE) wireless network node comprising:

circuitry configured to transmit a system information block (SIB) including information associated with a physical uplink channel; wherein the physical uplink channel for use by a wireless transmit/receive unit (WTRU) to send feedback information during transmission time intervals (TTIs) that the WTRU is not allocated resources for transmitting dedicated data to the wireless network node; wherein the circuitry is further configured to receive acknowledgement feedback information from the WTRU on a first frequency resource associated with the physical uplink channel and to receive channel quality indicator feedback from the WTRU on a second frequency resource associated with the physical uplink channel; wherein the first and second frequency resources are different.

50. The LTE wireless network node of claim 49 wherein the first frequency resource and the second frequency resource are different subcarriers.

* * * * *

UNITED STATES PATENT AND TRADEMARK OFFICE
CERTIFICATE OF CORRECTION

PATENT NO. : 8,509,076 B2  
APPLICATION NO. : 11/869923  
DATED : August 13, 2013  
INVENTOR(S) : Reznik et al.

Page 1 of 1

It is certified that error appears in the above-identified patent and that said Letters Patent is hereby corrected as shown below:

ON THE TITLE PAGE

Item [75], after "Paul", delete "Mariner" and insert therefor --Marinier--.

Item [57], line 1, after "transmit/receive", delete "units (WTRUs)" and insert therefor --unit (WTRU)--.

IN THE CLAIMS

Claim 23, column 13, line 37, after the word "indicating", delete "of".

Signed and Sealed this  
Twenty-fourth Day of June, 2014

Michelle K. Lee  
*Deputy Director of the United States Patent and Trademark Office*